Nov. 29, 1949  C. TROTTMANN  2,489,599
EXTRACTION OF COTTON SEED OIL
Filed Nov. 23, 1945
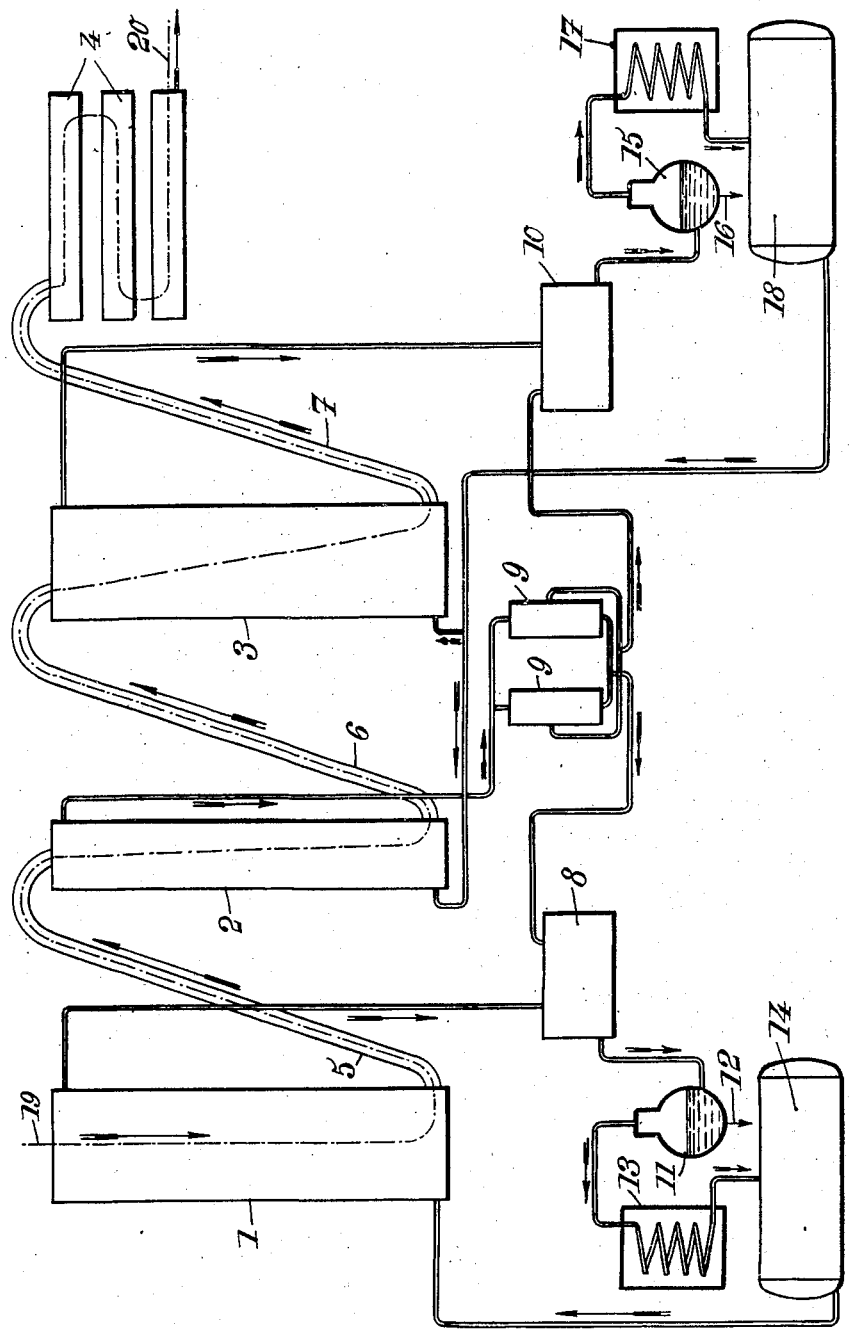
Inventor
C. Trottmann
By Haseltine Downing Rublee
Attys.

Patented Nov. 29, 1949

2,489,599

UNITED STATES PATENT OFFICE 2,489,599

EXTRACTION OF COTTONSEED OIL

Constant Trottmann, Versailles, France

Application November 23, 1945, Serial No. 630,464
In France December 9, 1944

1 Claim. (Cl. 260—412.4)

In order to obtain cotton-seed oil, the pressure extraction process is generally used, consisting in the following principal operations: first the kernels are separated from the husks by mechanical means, the kernels are crushed, heated and treated in hydraulic presses to furnish on the one hand a crude oil of a very dark colour and on the other hand an oil cake still containing an appreciable amount of oil, for example, from 6 to 6.5%. The oil is liberated from its free fatty acids and colouring matter by a caustic soda treatment, by which, after washing and drying, is obtained an oil of the type called "English oil" and a residue called "soap-stock" which contains the fatty acids in a form of soap and the colouring matter. This soapstock is decomposed by heating with sulphuric acid, then treated to separate fatty acids from the entrained neutral oil, the product so obtained being called "blackgrease" and is a mixture of fatty acids and colouring matter, which must be thereafter distilled. The oil cake is submitted to crushing and screening.

The present invention has for its object a more economical process with a higher yield, by omitting the husking of the seeds, the refining of the oil and the treating of the "soap-stock," and obtaining directly by oil extraction cakes which contain only a very small amount of oil. This process consists essentially in submitting the crushed seeds without preliminary husking to a continuous extraction carried out with the aid of two solvents in a successive selective manner to separate first the fatty acids and the colouring matter, and thereafter the neutral oil, the cake being given an intermediate treatment to remove the first solvent before applying the second.

The first solvent consists, for example, of alcohol and the second of light petroleum ether. The removal of the alcohol from the cake after the first step of extraction is carried out in a continuous current of light ether, for example, petroleum ether, which is sent in a decanting tank with a small addition of water to cause the separation of alcohol from the ether.

The invention further relates equally to the equipment for carrying out the process and comprises, essentially, an extraction column for fatty acids and colouring matter, a smaller column for removing the first solvent and an extraction column for the neutral oil, as well as the distillation equipments and the decanting accessories.

By way of example of an embodiment of the invention, reference is made to the accompanying drawing which shows a scheme of the equipment for carrying out the process.

The seeds, previously crushed, are introduced at 19 in the top of the column 1, where they are contacted for example with a desired quantity of alcohol arriving from the storage tank 14 and circulating counter-currently. For this column 1 all the known types of apparatus can be utilized, wherein the seeds may descend by gravity, or by means of perforated drums where the seeds are rinsed with the solvent, or by all other means. The admission of the seeds must be controlled in such a manner, that at their arrival at the bottom of the column they are completely exhausted. The alcohol enters at the bottom of the column and leaves at the top of the same charged with the fatty acids and the colouring matter; thence it flows into a receiving tank 8, where it is directed to the distillation apparatus 11 or it is evaporated to be used again leaving the "blackgrease" extract at 12. This product is a mixture of free fatty acids derived from the oil and the colouring matter. It is identical to that obtained by the decomposition of the soapstock derived by the refining of crude oil by means of the caustic soda. This blackgrease needs only to be washed with hot water to be ready for distillation in which it will furnish on one hand the white fatty acids and on the other hand a pitch. The alcohol evaporated in 11 is sent to a condenser 13 to be received in the tank 14.

The cotton-seed cake must thereafter be freed from the impregnated alcohol as to be in the state required for another extraction with petroleum ether, for example. The cake cannot be heated to evaporate the alcohol because the petroleum ether coming thereafter in contact with the cake would start boiling. The separation of the alcohol is the characteristic feature of the present invention and is effected in the following manner. The cake is taken from the bottom of the column 1 by a perforated bucket-elevator 5 where it drains and enters into the second column 2 of a much smaller diameter but of the same height. Here it meets a very slow current of light ether, for example, petroleum ether (boiling between 60° to 80°) coming from the storage tank 18. This ether, which enters from the bottom of the column, leaves at the top and enters the decanting tank 9. When the same is full, the ether is directed into a second decanting tank 9 and vice versa. It is sufficient to add into the decanting tank, when the same is full, a very small amount of water in order to effect the separation of the alcohol from the ether. The alcohol is sent to 8 and the ether to 10 to be distilled each on its side with the extracts coming from the columns 1 and 3.

The cake impregnated with ether is taken at the bottom of the small column 2 by an elevator 6 which conveys it to the top of a third column 3 where it meets a current of light petroleum ether circulating in the opposite direction.

The descending of the cake must be controlled in such a way that when the same arrives at the bottom of the column 3, it becomes completely freed from its oil. The ether entering at the bottom of the column 3 leaves the top, charged with neutral oil, it proceeds then to the receiver tank 10, thereafter passes to the distillation apparatus 15 where it evaporates and enters the circuit again after passing the condenser 17 and returning to the tank 18. The oil remaining in the still is extracted in 16 by a centrifuge or is filtered. It is neutral (circa 0.10% acidity). Its colour is light (circa 12 R. Lovibond). It needs not to be subjected to other treatments before being deodorized as desired.

The cake impregnated with ether is taken from the bottom of the column 3 by a perforated bucket elevator 7, and it is conveyed to the drying apparatus 4 of some suitable type. In this apparatus the ether is completely evaporated, and the dry cake leaves at 20.

The cake is again pulverized. The husk resists crushing much better than the pulp which disintegrates and falls as a very fine powder. It is now only necessary to separate by screening the husks from the powder of the kernels.

In this manner a very fine cake flour is obtained having a light yellow colour. Its oil contents is not more than 1 to 1.5% (as compared to 6 to 6.5% for cake obtained by pressing). The increased percentage of proteinic matter, which it contains, makes a food of high value for the cattle.

The present process shows a number of advantages as compared with the existing process of applying pressure, among which can be cited the following:

(1) Omission of the preliminary husking of the seeds which does not in any case give a complete separation of the kernels and the husks.

(2) Replacing of the hydraulic presses by the continuous extractors which assures a great economy in motor power and labor.

(3) Omission of the refining of the oil obtained from the press, which saves material, motor power, labor and caustic soda.

(4) Omission of the treatment of "soap stock," thereby economizing material, sulphuric acid, catalyst, labor and steam.

(5) Obtaining directly a cake-flour containing no more than 1 to 1.5% oil instead of 6 to 6.5% with an oil gain of 4,5 to 5.5%.

It will be understood that the example described in reference to the accompanying drawing is not to be considered as of limitative character and that certain intermediate operations or accessories can be modified without departing from the spirit of the invention. Instead of applying the solvents indicated here, all other solvents suitable for a selective extraction can be used. Finally the diverse operations can be carried out in a non-continuous apparatus which permits retention of the essential advantages hereof.

I claim:

In a process for extracting cotton seed oil wherein unhulled seeds are first extracted with an alcohol and then extracted with a light petroleum ether, the improvement comprising intermediately removing the alcoholic solvent after the first extraction by passing a slow current of light petroleum ether over the alcohol treated seeds to remove the alcohol and separating the alcohol from the light petroleum ether by addition of water.

CONSTANT TROTTMANN.

REFERENCES CITED

The following references are of record in the file of this patent:

UNITED STATES PATENTS

| Number | Name | Date |
|---|---|---|
| 1,434,089 | Christensen | Oct. 31, 1922 |
| 1,487,449 | Eddy | Mar. 18, 1924 |
| 1,653,201 | Bollmann | Dec. 20, 1927 |
| 2,227,605 | Swallen et al. | Jan. 7, 1941 |
| 1,917,734 | Rewald | July 11, 1933 |